United States Patent
Mallette et al.

(10) Patent No.: US 6,636,574 B2
(45) Date of Patent: Oct. 21, 2003

(54) DOPPLER SPREAD/VELOCITY ESTIMATION IN MOBILE WIRELESS COMMUNICATION DEVICES AND METHODS THEREFOR

(75) Inventors: Alexandre Mallette, Chicago, IL (US); John Paul Oliver, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 244 days.

(21) Appl. No.: 09/871,116

(22) Filed: May 31, 2001

(65) Prior Publication Data

US 2002/0181553 A1 Dec. 5, 2002

(51) Int. Cl.$^7$ .............................. H04L 7/02; H04B 1/69; H04B 7/185
(52) U.S. Cl. .................. 375/360; 342/357.05; 375/150
(58) Field of Search .................. 375/360, 142, 375/144, 148, 150, 224, 343, 346; 342/104, 105, 357.05, 418, 717, 405; 455/441, 67.6

(56) References Cited

U.S. PATENT DOCUMENTS

| | | | |
|---|---|---|---|
| 5,809,064 A | | 9/1998 | Fenton et al. |
| 6,047,017 A | * | 4/2000 | Cahn et al. ................. 375/148 |
| 6,219,561 B1 | | 4/2001 | Raleigh |
| 6,373,862 B1 | * | 4/2002 | Kiasaleh ..................... 370/515 |
| 6,424,642 B1 | * | 7/2002 | Schmidl et al. ............. 370/342 |
| 6,442,202 B1 | * | 8/2002 | Borer ..................... 375/240.16 |
| 6,470,044 B1 | * | 10/2002 | Kowalski ..................... 375/148 |

OTHER PUBLICATIONS

Doppler Spread Estimation in Mobile Radio Systems; Authors—Leonid Krasny, Huseyin Arslan, David Koilpillai and Sandeep Chennakeshu; IEEE Communications Letters, vol. 5, No. 5, May 2001; pp. 197–199.

Estimation of Maximum Doppler Frequency for Handoff Decisions; Authors—Ashwin Sampath and Jack M. Holtzman, Wireless Information Network Laboratory (WINLAB), Rutgers University, Piscataway, NJ 08855–0909; pp. 859–862.

\* cited by examiner

Primary Examiner—Khai Tran

(57) ABSTRACT

A method for estimating Doppler spread in mobile wireless communication devices, for example in CDMA or W-CDMA cellular communication systems, with improved noise immunity. The Doppler spread estimation is based on an estimated value of an autocorrelation or autocovariance at a first lag (210) and at a second lag (220), the magnitude of which is greater than the first lag. A first ratio is determined (250) between a first difference (230) and a second difference (240). The estimated Doppler spread is generally proportional to a square root (260) of the first ratio, and is scaled (270) by a multiplicative factor that depends on whether the estimated function is an autocorrelation or autocovariance function.

24 Claims, 3 Drawing Sheets

DOPPLER SPREAD/VELOCITY ESTIMATION IN MOBILE WIRELESS COMMUNICATION DEVICES AND METHODS THEREFOR

FIELD OF THE INVENTIONS

The present inventions relate generally to mobile wireless communication devices, and more particularly to estimating Doppler spread/velocity in mobile wireless communication devices.

BACKGROUND OF THE INVENTIONS

The performance of many cellular communication systems is dependent on the accuracy of the estimation of unknown parameters, for example, fading channel coefficients in third-generation cellular communication systems, by a mobile wireless communication station or device.

One significant source of parameter estimate inaccuracy is the Doppler phenomenon experienced when a mobile station is in motion. Channel estimation in some cellular communication systems, for example, requires filtering pilot signals received at the mobile station. The optimum bandwidth of the filter is dependent on the Doppler spread.

Velocity is proportional to frequency and thus to Doppler spread. Knowledge of accurate Doppler spread in mobile wireless communication devices is useful for assigning slower mobile stations to micro-cells and for assigning faster mobile stations to macro-cells, and for making relatively precise power control measurements.

It is known how to estimate Doppler spread based on the autocovariance of the square of the magnitude of a signal received at the mobile station. A problem with this approach however is estimator degradation, which results from poor noise immunity associated with estimating the autocovariance of a squared magnitude at lag 0. Another problem with this prior art approach is that it is based upon estimates of $1^{st}$ and $2^{nd}$ order moments of the squared magnitude of the received signal, which are basically $2^{nd}$ and $4^{th}$ order moments of the signal. Higher order moments of the received signal are generally more difficult to estimate than lower order moments thereof, and thus prior art Doppler spread estimates based on estimates of $1^{st}$ and $2^{nd}$ order moments of the squared magnitude of the received signal are susceptible to inaccuracies, which may result in poor system performance.

The various aspects, features and advantages of the present inventions will become more fully apparent to those having ordinary skill in the art upon careful consideration of the following Detailed Description of the Inventions and the accompanying drawings described below.

DETAILED DESCRIPTION OF THE INVENTIONS

In the present invention, Doppler spread is estimated in mobile wireless communication devices, for example cellular telephone handsets, personal digital assistants, wireless enabled computers, etc.

In one embodiment, the Doppler spread estimation is based on the real part of an estimated autocorrelation function of the impulse response of a channel over which a signal is communicated. Further references herein for the estimated autocorrelation function refers to the real part thereof. And in another embodiment, the Doppler spread estimation is based on an estimated autocovariance function of the magnitude squared of the impulse response of a channel over which a signal is communicated. The Doppler spread estimates of the present inventions have, among other advantages over the prior art, improved noise immunity.

Figure 2:
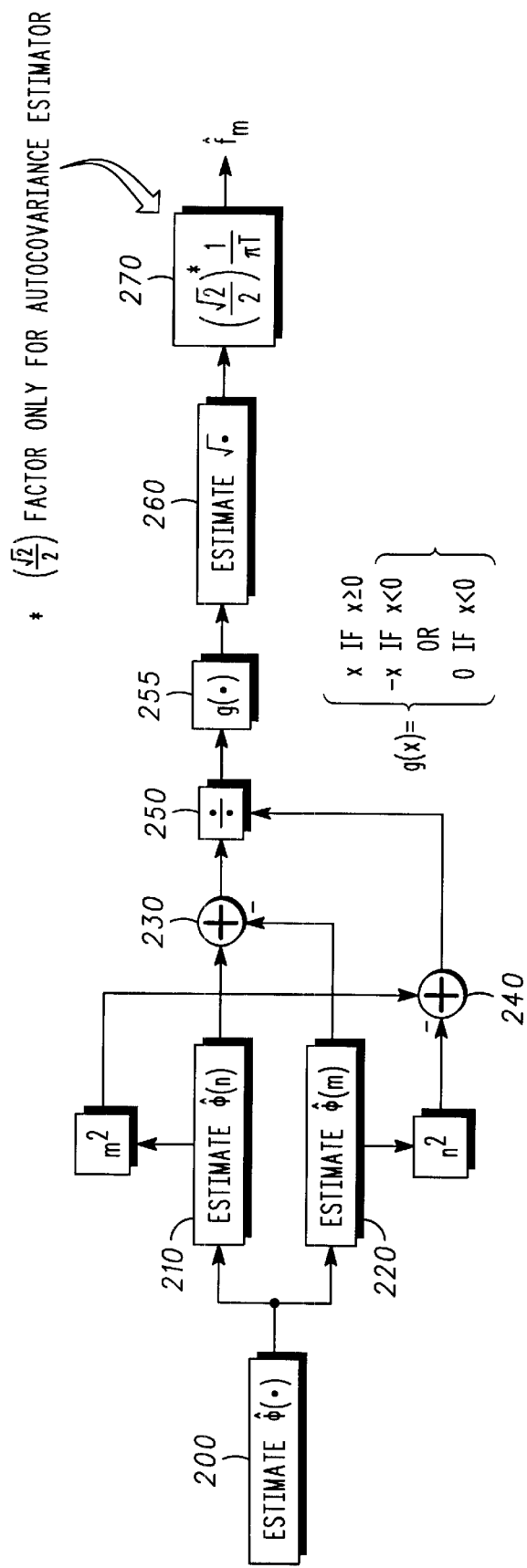
FIG. 2 is a schematic process flow diagram for determining Doppler spread.

In FIG. 2, at block 200, the autocovariance or the autocorrelation function is estimated. The estimation of autocorrelation or autocovariance functions is known generally. In narrow-band communication systems, for example, the autocovariance or the autocorrelation function may be based on a signal received at the mobile wireless communication device.

In TDMA systems, the estimated autocovariance or autocorrelation function may be based on an output of an adaptive equalizer or at some other circuit portion of the wireless mobile communication device.

Figure 1:
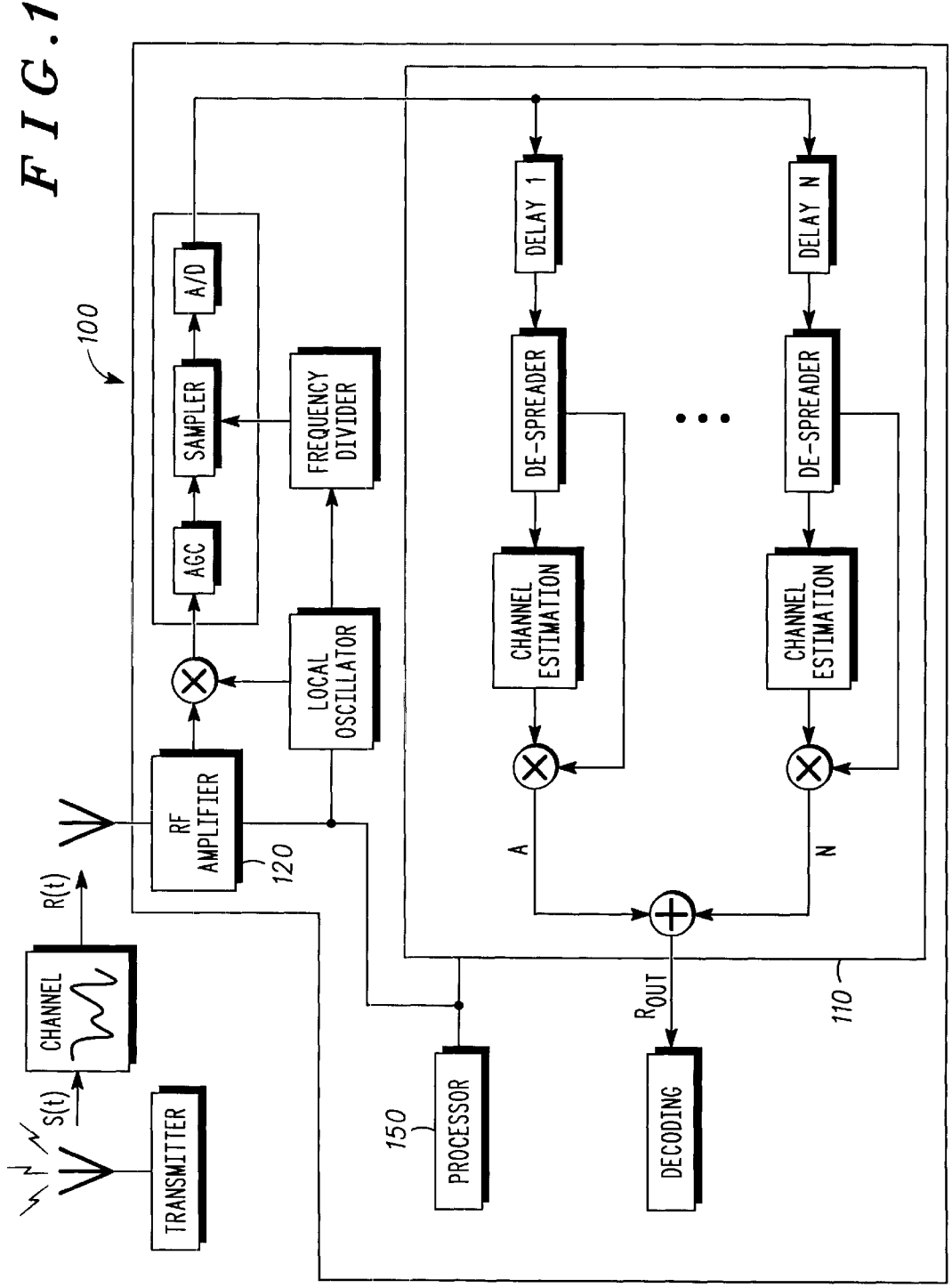
FIG. 1 is a communication system including a mobile wireless communication device for which Doppler spread is estimated according embodiments of the present inventions.

In one embodiment, as illustrated in the exemplary CDMA or WCDMA receiver 100 of FIG. 1, an estimated autocorrelation function is based on I and/or Q signal components of one or more of several rake fingers A–N associated with a particular path of a rake receiver 110. In another embodiment, an estimated autocovariance function is based on I and Q signal components of one or more of the rake fingers of the rake receiver 110. Alternatively, the estimated autocovariance function may be also based on an output, Rout, of a rake receiver 110.

The exemplary device 100 of FIG. 1 includes generally an amplifier 120 and other components, including a baseband processor, a digital signal processor, a display and inputs, some of which are not illustrated but are well known in the art, under the control of a local processor 150, for example a programmable DSP or dedicated hardware circuitry like an ASIC or other processor or combinations as is known by those having ordinary skill in the art.

In one embodiment of the invention, the autocorrelation function is estimated from either the in-phase or the quadrature components of a signal, and in another embodiment the autocorrelation function is estimated from both the in-phase and the quadrature components of the signal. In yet another embodiment, the autocovariance function is estimated from the squared magnitude of a signal.

In FIG. 2, at block 210, a first value of the autocovariance or the autocorrelation function is estimated for a first lag, n. In embodiments of the inventions where the estimated function is an autocovariance function, the first lag is any positive or negative non-zero value, and in embodiments where the estimated function is an autocorrelation function the first lag, n, may be any value including zero.

At block 220, a second value of the estimated autocorrelation or autocovariance function is estimated at a second lag, m, having a magnitude that is greater than a magnitude of the first lag, n.

In FIG. 2, a first ratio is calculated between a first difference and a second difference. The first difference is a difference between the estimated value at the first lag, n, and the estimated value at the second lag, m. The first difference is shown calculated schematically at difference block 230. The second difference is a difference between a first product and a second product. The first product is a product of the second lag squared, $m^2$, and the estimated value at the first lag, n. The second product is a product of the first lag squared, $n^2$, and the estimated value at the second lag, m. The second difference is shown calculated schematically at difference block 240.

The first ratio of the first and second differences is calculated schematically at divider block 250, and is expressed quantitatively as $$x=[\phi(n)-\phi(m)]/[m^2\phi(n)-n^2\phi(m)] \qquad \text{Eq. (1)}$$

where $\phi(n)$ is an estimated value of either estimated autocorrelation or autocovariance having the first lag, n, and $\phi(m)$ is an estimated value of the same estimated function having the second lag, m.

In FIG. 2, at block 255, a magnitude of the first ratio is calculated if the first ratio, x, is less than zero. Thus the output of block 255 is the magnitude of the first ratio. Alternatively, at block 255, if the first ratio is less than zero the output of block 255 is set to zero. If the first ratio is greater than zero, then the first ratio is the output of block 255.

At block 260, the square root of the output of block 255 is calculated. If the first ratio is greater than zero, the Doppler spread is proportional to the square root of the first ratio. If the first ratio is less than zero, then the Doppler spread is proportional to the square root of the magnitude of the first ratio. Alternatively, if the first ratio is less than zero, the Doppler spread is zero.

In FIG. 2, at block 270, the square root of the first ratio is scaled by a second ratio, wherein the estimated Doppler spread or velocity is proportional to a product of the second ratio and the square root of the first ratio. The second ratio is a reciprocal of a product of $\pi$ and T, where T is the inverse of a processing rate. The processing rate may be for example a symbol rate or a chip rate or some other rate known to those having ordinary skill in the art.

The second ratio is generally expressed qualitatively as $$1/(\pi T) \qquad \text{Eq. (2)}$$

In applications where the estimated function is an autocorrelation function, the Doppler spread is proportional to the product of the first and second ratios. In applications where the estimated function is an autocovariance function, the Doppler spread is proportional to the product of the first and second ratios scaled by a multiplicative factor of the square root of 2 divided by 2. Thus for the autocovariance function, Eq. (2) is scaled as follows:

$$\sqrt{2}/2 \qquad \text{Eq. (3)}$$

Figure 3:
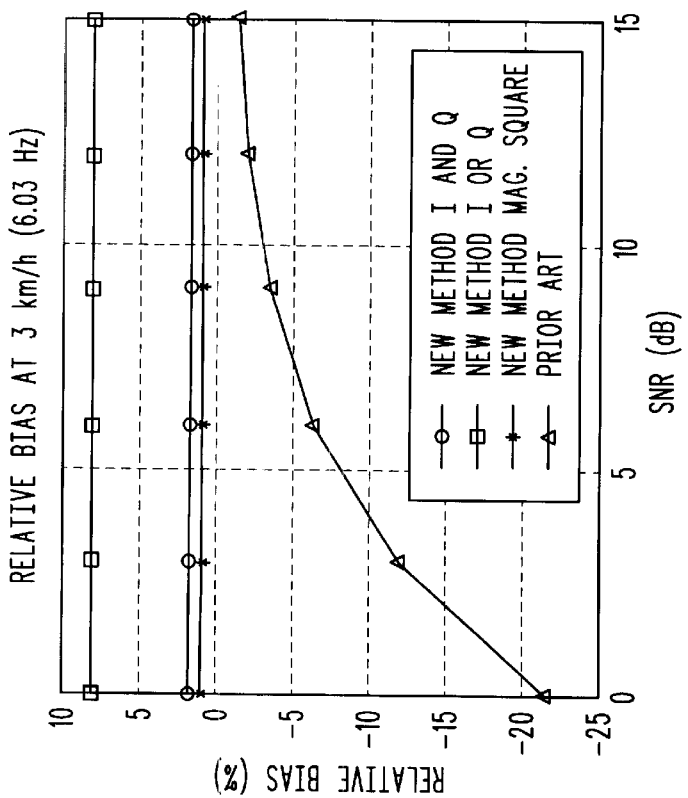
FIG. 3 is a graphical illustration of the relative bias versus signal to noise ratio (SNR) performance of several embodiments of the present inventions and the prior art.

FIG. 3 is a graphical illustration of the relative bias versus signal-to-noise-ratio (SNR) performance of several embodiments of the present inventions in comparison to the prior art. The graph illustrates generally a relatively constant estimated Doppler spread bias where the estimated autocorrelation function of the present inventions is based on both in-phase and/or quadrature components of the signal, or where the autocovariance function is based on the magnitude squared of the signal. By contrast, the prior art Doppler spread estimation bias is remarkably poorer at lower signal strengths. In FIG. 3, the Doppler spread estimate based on the estimated autocovariance function estimated from the magnitude of the signal squared or the Doppler spread estimate based on the estimated autocorrelation from both the in-phase and quadrature components thereof have comparatively less bias than the estimated Doppler spread based only on one of the in-phase or the quadrature component of the signal.

Figure 4:
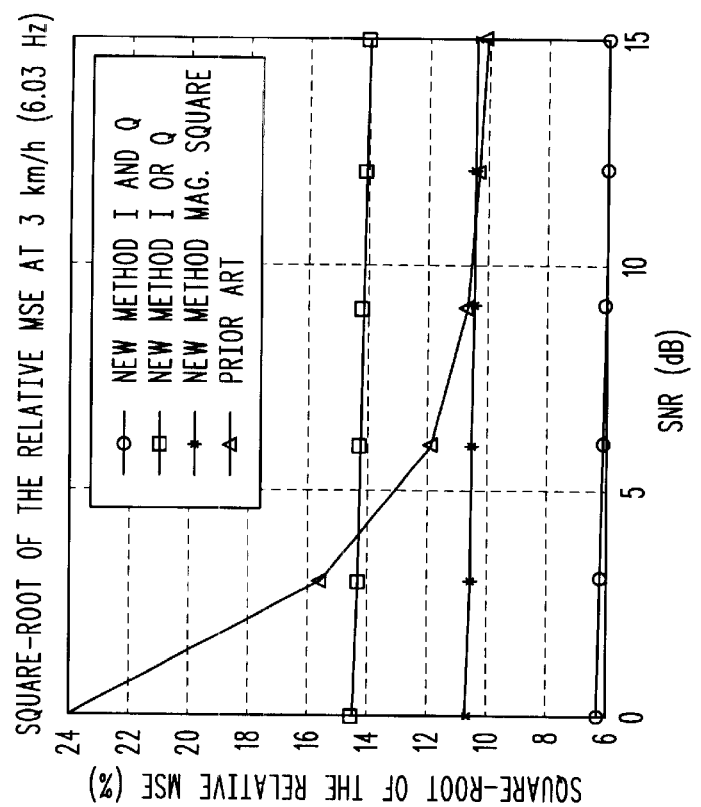
FIG. 4 is a graphical illustration of the square root of the relative mean squared error (RMSE) versus SNR performance of several embodiments of the present inventions and the prior art.

FIG. 4 is a graphical illustration of the square root of the relative mean-square-error (RMSE) versus SNR performance of several embodiments of the present inventions in comparison to the prior art. The graph illustrates generally a relatively constant RMSE for the estimated Doppler spread for embodiments where the estimated autocorrelation function of the present inventions is based on in-phase and/or quadrature components of the signal, or where the estimated autocovariance function is based on the magnitude squared of the signal. In contrast, the prior art Doppler spread estimation has a remarkably large RMSE at lower signal strengths. In FIG. 4, the RMSE based on the estimated autocovariance function estimated from the magnitude of the signal squared or the autocorrelation function based on both the in-phase and quadrature components of the signal is comparatively less than the prior art, particularly at lower signal strengths.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method for estimating Doppler spread in a mobile wireless communication device, comprising:

estimating a value of an estimated autocorrelation of an impulse response of a channel for first and second lags, the second lag having a magnitude greater than a magnitude of the first lag;

determining a first ratio between a first difference and a second difference, the first difference is a difference between the estimated value at the first lag and the estimated value at the second lag, the second difference is a difference between a first product and a second product, the first product is a product of the second lag squared and the estimated value at the first lag, the second product is a product of the first lag squared and the estimated value at the second lag;

determining a square root of the first ratio if the first ratio is greater than zero;

determining Doppler spread proportional to the square root of the first ratio.

2. The method of claim 1, determining a square root of an absolute value of the first ratio if the first ratio is less than zero.

3. The method of claim 1, setting the value of the first ratio to zero if the first ratio is less than zero.

4. The method of claim 1, determining the Doppler spread by multiplying the square root of the first ratio by a second ratio, the second ratio is a reciprocal of a product of $\pi$ and T, where T is an inverse processing rate.

5. The method of claim 1, estimating the autocorrelation from both in-phase and quadrature components of a signal.

6. The method of claim 1, estimating the autocorrelation from one of an in-phase and quadrature component of a signal.

7. A method for estimating Doppler spread in a mobile wireless communication device, comprising:
   estimating a value of an estimated autocovariance of a magnitude squared of an impulse response of a channel for a first non-zero lag and for a second lag, the second lag having a magnitude greater than a magnitude of the first lag;
   determining a first ratio between a first difference and a second difference,
   the first difference is a difference between the estimated value at the first lag and the estimated value at the second lag,
   the second difference is a difference between a first product and a second product, the first product is a product of the second lag squared and the estimated value at the first lag, the second product is a product of the first lag squared and the estimated value at the second lag;
   determining a square root of the first ratio if the first ratio is greater than zero;
   determining Doppler spread proportional to the square root of the first ratio.

8. The method of claim 7, determining a square root of an absolute value of the first ratio if the first ratio is less than zero.

9. The method of claim 7, setting the value of the first ratio to zero if the first ratio is less than zero.

10. The method of claim 7, determining the Doppler spread by multiplying the square root of the first ratio by a second ratio, the second ratio is a ratio of the square root of 2 divided by a product of $2\pi$ and T, where T is an inverse processing rate.

11. A mobile wireless communication device, comprising:
    means for determining a square root of a first ratio greater than zero,
    the first ratio defined by $[\phi(n)-\phi(m)]/[m^2\phi(n)-n^2\phi(m)]$,
    where $\phi(n)$ is an estimated value of an estimated autocorrelation of an impulse response of a channel at a first lag, n, $\phi(m)$ is an estimated value of the estimated autocorrelation at a second lag, m,
    a magnitude of the second lag m greater than a magnitude of first lag n;
    means for determining Doppler spread proportional to a square root of the first ratio if the first ratio is greater than zero.

12. The device of claim 11, means for determining a square root of an absolute value of the first ratio if the first ratio is less than zero.

13. The device of claim 11, means for setting the value of the first ratio to zero if the first ratio is less than zero.

14. The device of claim 11, means for scaling the square root of the first ratio by a multiplicative factor of the reciprocal of a product of $\pi$ and T, where T is the inverse of a processing rate.

15. The device of claim 11, a rake receiver having a plurality of rake fingers, means for estimating the autocorrelation from an output of one or more of the plurality of rake fingers.

16. The device of claim 11, means for estimating the autocorrelation from both in-phase and quadrature components of a received signal.

17. The device of claim 11, means for estimating the autocorrelation from one of an in-phase or a quadrature component of a received signal.

18. A mobile wireless communication device, comprising:
    means for determining a square root of a first ratio greater than zero,
    the first ratio defined by $[\phi(n)-\phi(m)]/[m^2\phi(n)-n^2\phi(m)]$,
    where $\phi(n)$ is an estimated value of an estimated autocovariance from a magnitude squared of an impulse response of a channel at a first non-zero lag, n,
    $\phi(m)$ is an estimated value of the estimated autocovariance at a second lag, m,
    a magnitude of the second lag m greater than a magnitude of first lag, n;
    means for determining Doppler spread proportional to a square root of the first ratio if the first ratio is greater than zero.

19. The device of claim 18, means for scaling the square root of the first ratio by a multiplicative factor of the square root of 2 divided by a product of $2\pi T$, where T is the inverse of a processing rate.

20. The device of claim 18, a rake receiver, means for estimating the autocovariance from an output of the rake receiver.

21. The device of claim 18, a rake receiver having a plurality of rake fingers, means for estimating the autocovariance from an output of one or more of the plurality of rake fingers.

22. The device of claim 18, means for estimating the autocovariance from both in-phase and quadrature components of a received signal.

23. The device of claim 18, means for determining a square root of an absolute value of the first ratio if the first ratio is less than zero.

24. The device of claim 18, means for setting the value of the first ratio to zero if the first ratio is less than zero.

* * * * *